United States Patent
Wu et al.

(10) Patent No.: US 9,268,955 B2
(45) Date of Patent: Feb. 23, 2016

(54) SYSTEM, METHOD AND COMPUTER PROGRAM PRODUCT FOR CONDITIONALLY SHARING AN OBJECT WITH ONE OR MORE ENTITIES

(75) Inventors: Yongsheng Wu, Redwood City, CA (US); Andrew Smith, San Francisco, CA (US); Adam Torman, Oakland, CA (US); Punit Jain, Cupertino, CA (US)

(73) Assignee: salesforce.com, inc., San Francisco, CA (US)

( * ) Notice: Subject to any disclaimer, the term of this patent is extended or adjusted under 35 U.S.C. 154(b) by 417 days.

(21) Appl. No.: 13/047,709

(22) Filed: Mar. 14, 2011

(65) Prior Publication Data

US 2011/0225118 A1 Sep. 15, 2011

Related U.S. Application Data

(60) Provisional application No. 61/313,622, filed on Mar. 12, 2010.

(51) Int. Cl.
*G06F 21/60* (2013.01)
*G06F 21/62* (2013.01)

(52) U.S. Cl.
CPC .......... *G06F 21/604* (2013.01); *G06F 21/6209* (2013.01); *G06F 2221/2141* (2013.01)

(58) Field of Classification Search
CPC .................... G06F 17/30607; G06F 17/30595; G06F 21/6209; G06F 21/604
USPC .......... 707/608, 609, 704, 705, 781, 999.102, 707/999.006
See application file for complete search history.

(56) References Cited

U.S. PATENT DOCUMENTS

| | | | |
|---|---|---|---|
| 4,956,769 | A * | 9/1990 | Smith |
| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |
| 6,092,083 | A | 7/2000 | Brodersen et al. |
| 6,161,149 | A | 12/2000 | Achacoso et al. |
| 6,169,534 | B1 | 1/2001 | Raffel et al. |
| 6,178,425 | B1 | 1/2001 | Brodersen et al. |
| 6,189,011 | B1 | 2/2001 | Lim et al. |
| 6,216,135 | B1 | 4/2001 | Brodersen et al. |
| 6,233,617 | B1 | 5/2001 | Rothwein et al. |
| 6,266,669 | B1 | 7/2001 | Brodersen et al. |
| 6,295,530 | B1 | 9/2001 | Ritchie et al. |
| 6,324,568 | B1 | 11/2001 | Diec |
| 6,324,693 | B1 | 11/2001 | Brodersen et al. |
| 6,336,137 | B1 | 1/2002 | Lee et al. |

(Continued)

OTHER PUBLICATIONS

U.S. Appl. No. 60/828,192, filed Oct. 4, 2006.

*Primary Examiner* — Md. I Uddin

(57) ABSTRACT

In accordance with embodiments, there are provided mechanisms and methods for conditionally sharing an object with one or more entities. These mechanisms and methods for conditionally sharing an object with one or more entities can enable enhanced data sharing, simplified data security, etc.

19 Claims, 6 Drawing Sheets

(56) References Cited

U.S. PATENT DOCUMENTS

| | | |
|---|---|---|
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,209,929 B2 | 4/2007 | Dominguez, Jr. et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,779,039 B2 | 8/2010 | Weissman et al. |
| 8,015,495 B2 | 9/2011 | Achacoso et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 8,457,545 B2 | 6/2013 | Chan |
| 8,484,111 B2 | 7/2013 | Frankland et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2003/0233404 A1 | 12/2003 | Hopkins |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0065925 A1 | 3/2005 | Weissman et al. |
| 2005/0091098 A1 | 4/2005 | Brodersen et al. |
| 2005/0223022 A1 | 10/2005 | Weissman et al. |
| 2005/0283478 A1 | 12/2005 | Choi et al. |
| 2006/0021019 A1 | 1/2006 | Hinton et al. |
| 2006/0206834 A1 | 9/2006 | Fisher et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0359537 A1 | 12/2014 | Jackobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |

* cited by examiner

SYSTEM, METHOD AND COMPUTER PROGRAM PRODUCT FOR CONDITIONALLY SHARING AN OBJECT WITH ONE OR MORE ENTITIES

CLAIM OF PRIORITY

This application claims the benefit of U.S. Provisional Patent Application 61/313,622, entitled "CRITERIA BASED SHARING RULES FOR BUSINESS OBJECTS," by Wu et al., filed Mar. 12, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to object sharing, and more particularly to conditionally sharing objects.

BACKGROUND

The subject matter discussed in the background section should not be assumed to be prior on merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Conventional systems commonly allow for data sharing between entities of a system. For example, a record may be created by an entity of the system, and that entity may decide to share the record with another entity of the system. Unfortunately, techniques for sharing data between entities of a system have been associated with various limitations.

Just by way of example, traditional methods of sharing data between system entities may only allow the creator of the data to dictate which additional entities may access the data. In another example, only entities located at a higher level in a hierarchy than the creator of a record may be able to access the record. Accordingly, it is desirable to provide techniques that improve the sharing of data between entities of a system.

BRIEF SUMMARY

In accordance with embodiments, there are provided mechanisms and methods for conditionally sharing an object with one or more entities. These mechanisms and methods for conditionally sharing an object with one or more entities can enable enhanced data sharing, simplified data security, etc.

In an embodiment and by way of example, a method for conditionally sharing an object with one or more entities is provided. In one embodiment, an object is identified within a system. Additionally, it is determined whether the object meets one or more criteria. Further, the object is conditionally shared with one or more entities of the system, based on the determining.

While one or more implementations and techniques are described with reference to an embodiment in which conditionally sharing an object with one or more entities is implemented in a system having an application server providing a front end for an on-demand database system capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for conditionally sharing an object with one or more entities.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers.

Next, mechanisms and methods for conditionally sharing an object with one or more entities will be described with reference to example embodiments.

Figure 1:
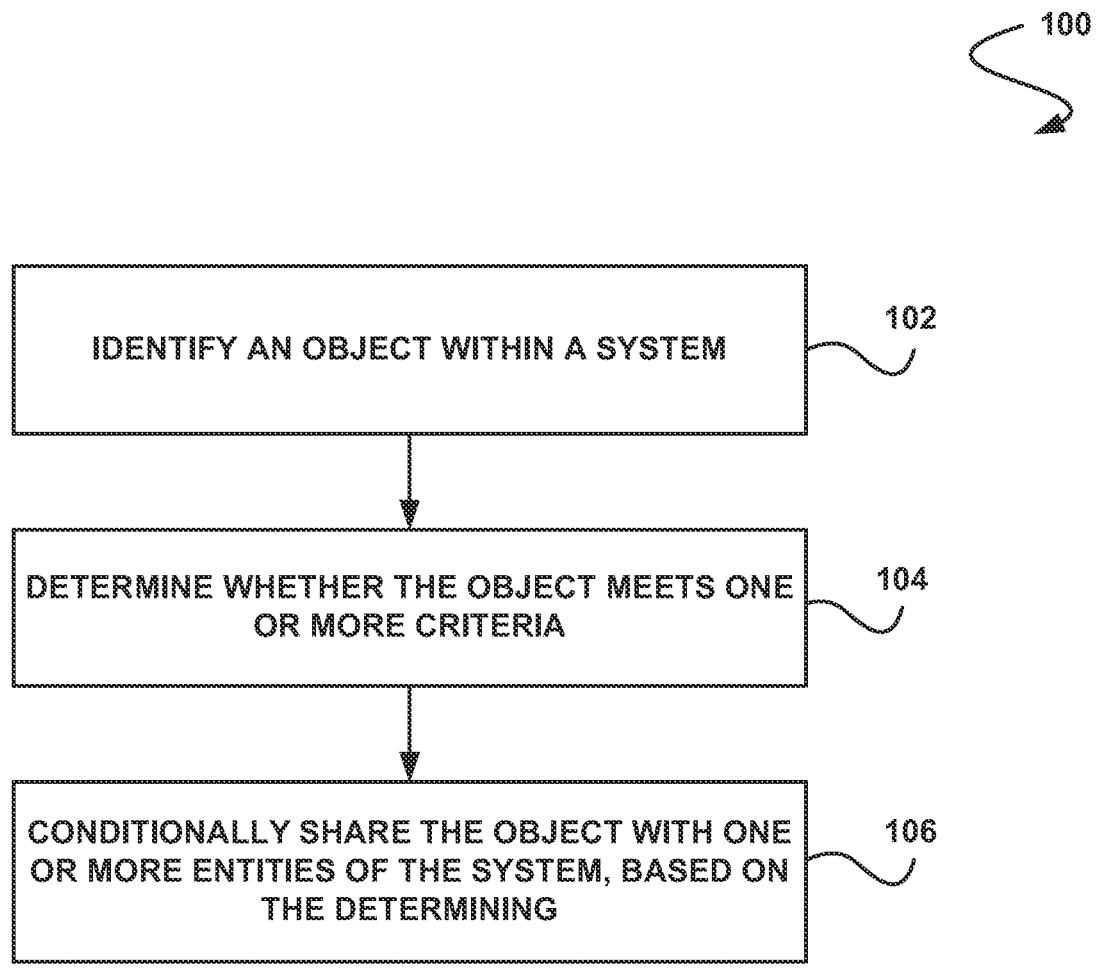
FIG. 1 illustrates a method for conditionally sharing an object with one or more entities, in accordance with one embodiment.

FIG. 1 illustrates a method 100 for conditionally sharing an object with one or more entities, in accordance with one embodiment. As shown in operation 102, an object is identified within a system. In one embodiment, the object may include a standard object. For example, the object may include a system record (e.g., a sales record, an employee record, a resources record, etc.) created within the system. In another example, the object may be created by a user of the system. Additionally, in another embodiment, the object may include a custom object. For example, the object may be defined by a user of the system, an administrator of the system, etc. In yet another embodiment, the object may be located within an organization of the system. Further, in one embodiment, the system may include a client, a server, a multi-tenant on-demand database system, etc.

Further still, it should be noted that, as described above, such multi-tenant on-demand database system may include any service that relies on a database system that is accessible over a network, in which various elements of hardware and software of the database system may be shared by one or more customers (e.g. tenants). For instance, a given application server may simultaneously process requests for a great number of customers, and a given database table may store rows for a potentially much greater number of customers. Various examples of such a multi-tenant on-demand database system will be set forth in the context of different embodiments that will be described during reference to subsequent figures.

Also, as shown in operation 104, it is determined whether the object meets one or more criteria. In one embodiment, determining whether the object meets one or more criteria may include determining one or more elements (e.g., fields, etc.) of the object. For example, the elements of the object may include one or more of an owner of the object, a name of the object, a group associated with the object, keywords associated with the object, a monetary value associated with the object, etc. In another embodiment, the elements of the object may be defined utilizing metadata associated with the object.

Additionally, in one embodiment, the one or more criteria may include one or more rules. For example, the one or more criteria may include a sharing rule filter that includes one or more requisite element values for the object. In another embodiment, the one or more rules may be created by a user (e.g., an administrator, etc.). In yet another embodiment, determining whether the object meets one or more criteria may include comparing the one or more elements of the object against the criteria. For example, determining whether the object meets one or more criteria may include determining whether each of the criteria is met by the object. In another example, determining whether the object meets one or more criteria may include determining whether the values of the one or more elements of the object meet the requirements of the values of the one or more criteria.

For instance, in one embodiment, the object may include a record with a region element, an opportunity size element, and a product line element. Additionally, the one or more criteria may include a region element value of "west," an opportunity size element value of greater than or equal to $500,000, and a product line element value of "router." Further, the record may be compared against the one or more criteria in order to determine whether the elements of the record match the element values of the one or more criteria.

Further still, as shown in operation 106, the object is conditionally shared with one or more entities of the system, based on the determining. In one embodiment, the object may be shared with the one or more entities if the object meets all of the criteria. In another embodiment, the object may be shared with the one or more entities if the object meets a predetermined amount of the criteria. Additionally, in one embodiment, the one or more entities of the system may include a user of the system, a group of users of the system, etc. In another embodiment, the object may be located within one organization of the system, and the one or more entities of the system may include one or more users from another organization of the system.

Also, in one embodiment, sharing the object may include making the object visible to the one or more entities. For example, sharing the object may include enabling the one or more entities to search for the object, view the object, etc. In another embodiment, sharing the object may include allowing the object to be accessed (e.g., read, modified, deleted, etc.) by the one or more entities of the system. In yet another embodiment, sharing the object may include adding the object to a share table. For example, sharing the object may include adding the object to a table that associates the object with the one or more entities that are able to access the object. Additionally, the share table may be compared against a group membership table that contains entities associated with one or more groups, and one or more entities in the group membership table that are associated with the object in the share table may be able to access the object.

Further, in one embodiment, the determining and conditional sharing may be performed before the one or more entities requests the object. In this way, the sharing of the object may be pre-calculated in order to reduce on-demand processing. Also, in another embodiment, the determining and conditional sharing may be performed in response to the creation of the object within the system.

In yet another embodiment, the determining and conditional sharing may be performed in response to detecting a change of one of the fields of the object. For example, a change in an opportunity field amount from $300,000 to $500,000 may be detected for the object by a system monitor, and this change may trigger the determining and conditional sharing. In yet another embodiment, the fields of the object whose change triggers the determining and conditional sharing may be predetermined (e.g., by an administrator, etc.).

Additionally, in another embodiment, the one or more entities of the system may be dynamically determined. For example, the one or more entities may include a set of users that is dynamically determined based on one or more characteristics of the users. In this way, the sharing of the object may not be dependent on the creator of the object, but on the content of the object itself as well as characteristics of the one or more entities. Additionally, the sharing of the object may be performed in a dynamic manner, and may be determined each time data changes within the object.

Figure 2:
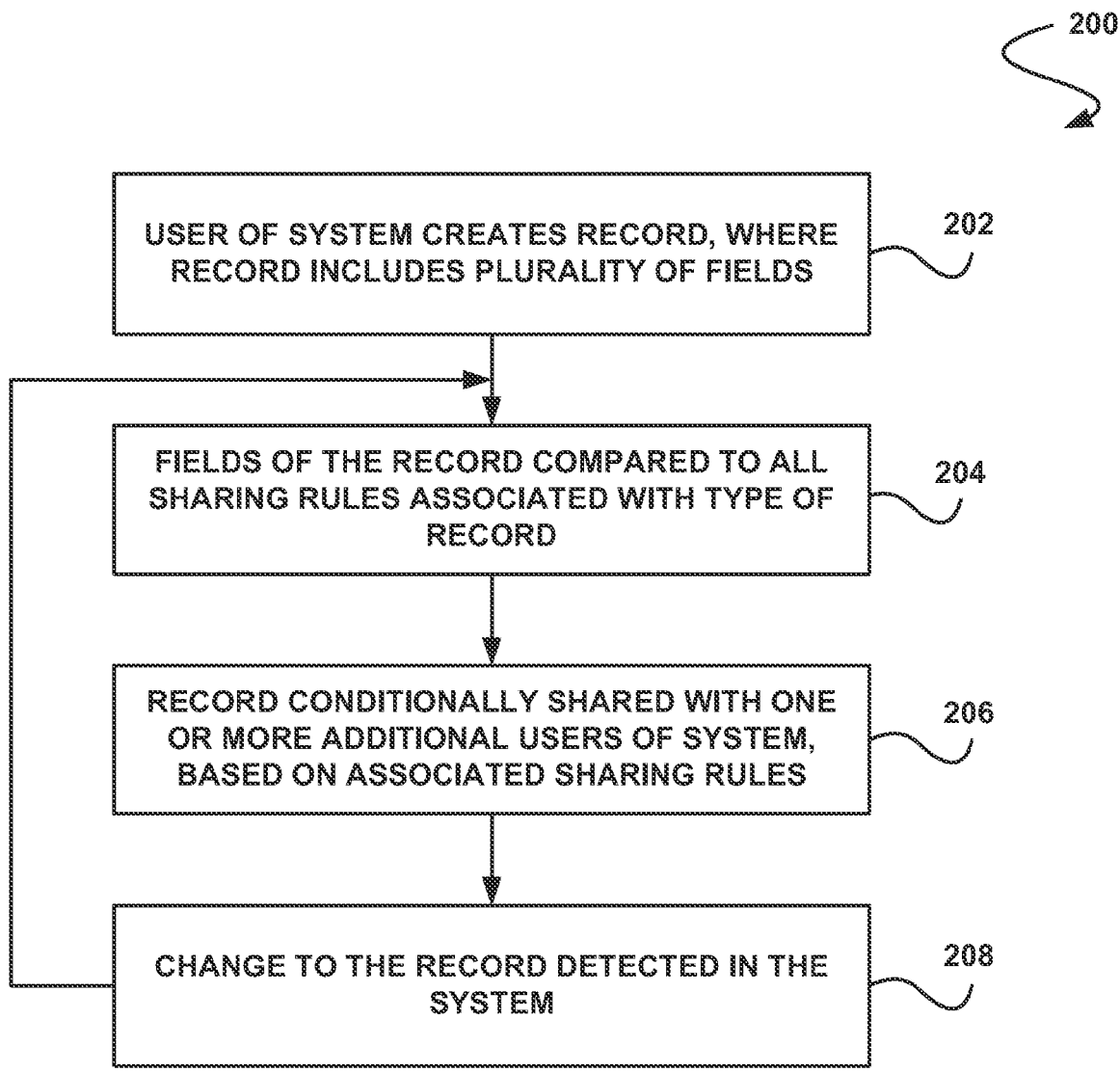
FIG. 2 illustrates a method for conditionally sharing a record with users of a system, in accordance with another embodiment.

FIG. 2 illustrates a method 200 for conditionally sharing a record with users of a system, in accordance with another embodiment. As an option, the present method 200 may be carried out in the context of the functionality of FIG. 1. Of course, however, the method 200 may be carried out in any desired environment. The aforementioned definitions may apply during the present description.

As shown in operation 202, a user of a system creates a record, where the record includes a plurality of fields. In one embodiment, the user may create the record utilizing an application of the system. In another embodiment, the user may belong to an organization of the system. Additionally, in another embodiment, the plurality of fields may include any information associated with the record.

Further, as shown in operation 204, the fields of the record are compared to all sharing rules associated with the type of the record (e.g., a sales record, an employee record, an inventory record, etc.). In one embodiment, the sharing rules may include criteria based sharing rules. Further still, as shown in operation 206, the record is conditionally shared with one or more additional users of the system, based on the associated sharing rules. In one embodiment, each sharing rule may dictate which users may access the record if the criteria within the rule are met. In another embodiment, the one or more additional users of the system may include users associated with different groups (e.g., different organizations, etc.) than the user that created the record.

Additionally, in another embodiment, the record may be shared with the one or more additional users utilizing a role hierarchy. For example, a hierarchy may exist within an organization, and the record may be shared with users located above a user with whom the record is shared based on the associated sharing rules. In this way, data visibility may be passed up a hierarchical chain within an organization of the system.

Also, as shown in operation 208, a change to the record is detected in the system. In one embodiment, a monitoring application may monitor records in the system in order to detect a change to the record. In another embodiment, a change to the record may include a change made to any of the plurality of fields of the record. In yet another embodiment, only predetermined fields of the record may be monitored for changes. For example, a registry of predetermined fields may be maintained by the monitoring application and only changes to those fields within the registry may be monitored for changes.

Additionally, in response to the detection of the change to the record in the system, the fields of the record are again compared to all sharing rules associated with the type of the record, as shown in operation 204. In this way, the sharing of the record may be dynamically adjusted as the contents of the record changes.

In another embodiment, the sharing rules associated with the record may include criteria associated with a stage of a process in which the record is being handled. For example, one of the rules may dictate that if a particular moment in the process has been reached with respect to the record, then the record may be shared with a user, a group of users, etc. In this way, process based visibility and security may be implemented for the record. Further, in one embodiment, users may have to satisfy one or more criteria before they are allowed to access the record. For example, a user may have to have a certain position or work in a particular department in order to view particular opportunities within the system.

Also, in yet another embodiment, the rules may be run against large volumes of associated records. In still another embodiment, criteria based following of records in social networks may be supported. For example, records within a social network may be analyzed and tracked, such that if a user changes a record (e.g., changes a size of an opportunity record, associates a comment with an opportunity record, adds an attachment to an opportunity record, etc.), the change may trigger a comparison to one or more rules. Additionally, the comparison may result in conditionally sharing the record with one or more users (e.g., via a mobile device update, an email message, etc.). In another embodiment, an administrator or other user may establish one or more rules that dictate certain users or groups who are to have access to records that meet a particular set of criteria. In yet another embodiment, security access (e.g., sharing access, etc.) may be required in order to follow a record. Further, the record may not need to be followed in order to have sharing access to it. In this way, users may be able to dynamically follow relevant records within a workflow, utilizing attribute based access control.

In still another embodiment, one or more users and/or groups may be granted access to a record residing in a separate organization from an organization in which the record originated and where the sharing rule associated with the record has been configured. In another embodiment, the organizations may both be found within a multi-tenant environment.

Further, in one embodiment, the rules may include filter items that may be made as flexible as possible. For example, cross-entity field references may be allowed when defining the criteria of a rule, so that a criteria-based sharing (CBS) rule may share all the opportunities with parent accounts in "Banking" industry to "Financial Services Sales Group," etc. However, if this type of filter item is enabled, every time the value of a field is changed in one entity, all the other entities that have a foreign key relationship with that entity may be found, and all the CBS rules of those entity types may be reevaluated. In another embodiment, cross-entity field references may not be allowed when defining filters in CBS.

In another embodiment, when CBS rules are created at the first place, or when the rule filter item gets changed, the rule may need to be evaluated against all the records of the entity type; while each individual record of the entity type may be edited, the CBS rules may only need to be evaluated against that record. Additionally, these two scenarios may have different performance indications, and therefore may need to be treated differently.

For example, in yet another embodiment, a circumstance may exist where an individual record is changed. In this case, a workflow rule evaluation engine or a formula evaluation engine may be leveraged to evaluate that record against all the CBS rules of the corresponding entity type. If the system provides a way to get the original copy of a record before any changes are made on it, it may be known whether the record complies with the CBS rules before and after the record is changed, and a share row may be added or deleted in the corresponding share table.

In another embodiment, share row alteration may be performed before the changes are committed to a system database in order to avoid multiple rule evaluation and corresponding share maintenance, since the record may be changed at various stages of update operations (e.g., triggers, workflow rule actions, etc.). Additionally, the CBS rule may have owner group membership based criteria which may not be evaluated without a separate round trip to the database, while the rest of the criteria may be evaluated with the field values in the same entity object.

In yet another embodiment, multiple CBS rules may exist for a particular entity type, and bulkification may be needed for group membership testing to improve performance. This may help with bulk update operations as well. Also, in another embodiment, group membership testing may be left to the end of the evaluation, since if the connector of owner group membership criterion and the rest of the criteria is "AND", redundant group membership criterion evaluation may be avoided.

In addition, in one embodiment, CBS rules may be defined, and the rule filter item may be changed, and that rule may need to be evaluated against all the records of that entity type. In another embodiment, a SELECT statement may be generated based on the criteria defined in the CBS rule, and share rows may be maintained in the corresponding share table based on the result set from the generated SELECT statement. In yet another embodiment, this may be accomplished using an infrastructure that generates WHERE clause conditions based on a formula (e.g., CBS criteria may be stored as a formula internally).

Further still, in another embodiment, the final SELECT statement may be constructed utilizing the formula, by appending a group membership testing condition on top of those conditions, which may include a simple join. To address a potentially large number of entity records returned from the SELECT statement, a chunking condition may be appended to the query generated.

Figure 3:
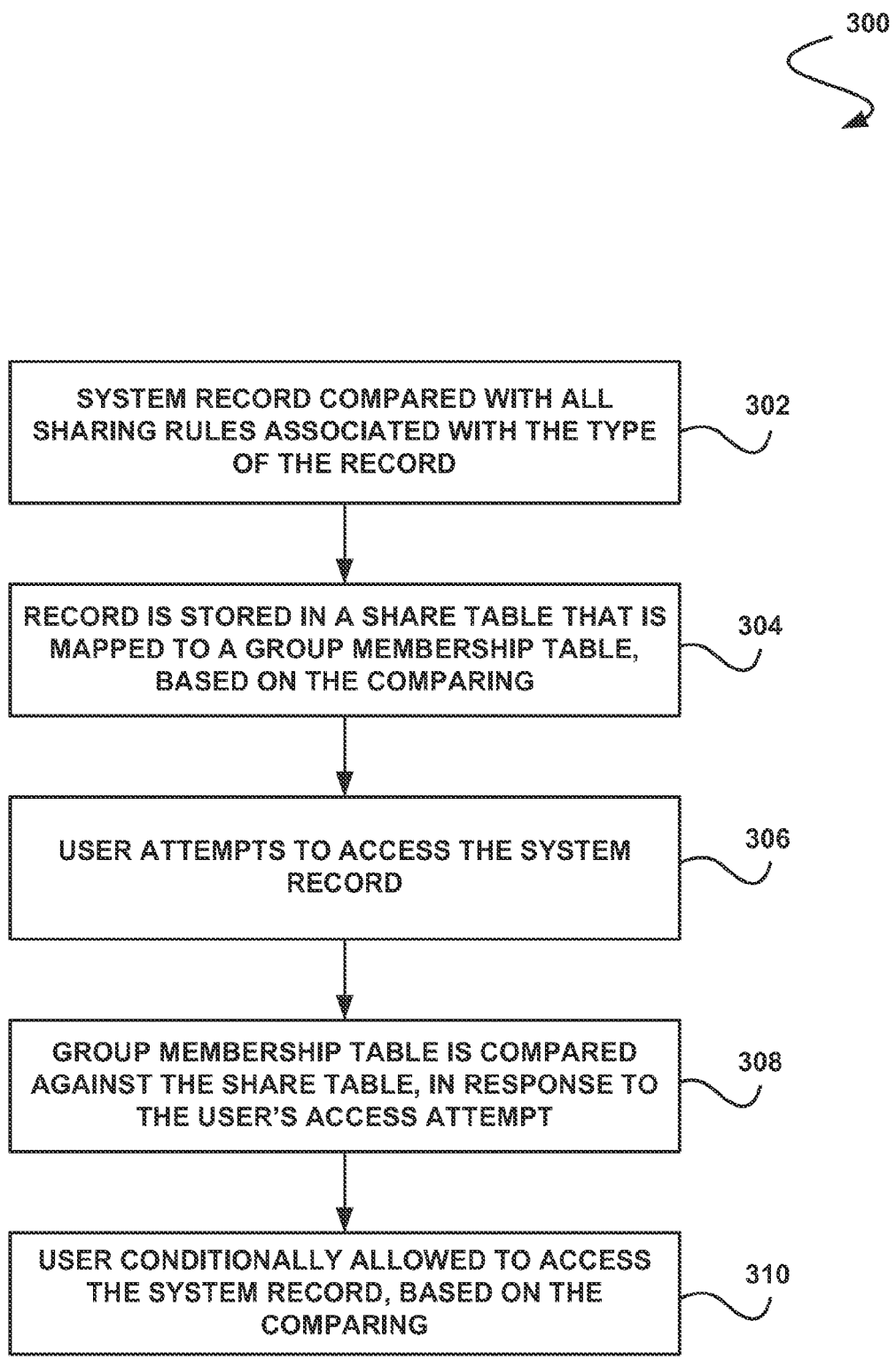
FIG. 3 illustrates a method for pre-calculating record access, in accordance with another embodiment.

FIG. 3 illustrates a method 300 for pre-calculating record access, in accordance with another embodiment. As an option, the present method 300 may be carried out in the context of the functionality of FIGS. 1-2. Of course, however, the method 300 may be carried out in any desired environment. The aforementioned definitions may apply during the present description.

As shown in operation 302, a system record is compared with all sharing rules associated with the type of the record. Additionally, as shown in operation 304, the record is stored in a share table that is mapped to a group membership table, based on the comparing. For example, it may be determined, based on the comparing, that the record is to be shared with one or more users, groups, etc. of the system. Additionally, the groups, users, etc. with whom the record is to be shared may be located in the group membership table and may be linked to the record within the share table (e.g., utilizing a flag, a pointer, etc.).

Further, as shown in operation 306, a user attempts to access the system record. In one embodiment, the user may perform a search for all records shared with the user. In another embodiment, the user may specifically attempt to access the system record. Also, as shown in operation 308, the group membership table is compared against the share table, in response to the user's access attempt. In one embodiment, a join operation may be performed between the group membership table and the share table. In another embodiment, the comparing may include determining whether the user is a member of a group within the group membership table that is linked to the record within the share table, such that the group may access the record.

Additionally, as shown in operation 310, the user is conditionally allowed to access the system record, based on the comparing. In one embodiment, if the user is determined to be a member of a group within the group membership table that is linked to the record within the share table, then the user may be allowed to access the system record. In another embodiment, if the user is not determined to be a member of a group within the group membership table that is linked to the record within the share table, then the user may not be allowed to access the system record.

In another embodiment, if a change is detected within the record, the record is again compared to all applicable rules, and the share table is updated accordingly. In this way, the share table may be dynamically maintained. Additionally, only a share table and group membership table comparison may be run when the user attempts to access a record, thereby avoiding runtime criteria based sharing rule computation. Further, access queries may be responded to in a fast and efficient manner.

Additionally, in another embodiment, an anonymous group may be created on behalf of real shared_to groups, which may contain the real shared_to groups (one or multiple) as its group members. This way, multiple target groups may be supported in one CBS rule, and sharing maintenance may be performed easily and efficiently, because every sharing row caused by a CBS rule may have a unique target group associated with it, and if a CBS rule gets created, only new rows may be added to the corresponding sharing table.

Further, in another embodiment, if a CBS rule gets changed, when considering inserting/updating/deleting existing sharing rows, only rows with that unique group id may be considered. Further still, when a CBS rule is deleted, only those sharing rows with the unique group id may be deleted. Also, when an entity object is updated, all the CBS rules on that record may be evaluated synchronously before the whole transaction is committed. This may be a process very similar to workflow. In another embodiment, a predetermined number of CBS rules may be allowed per entity (e.g., 10-100 CBS rules per entity, etc.). Further, in addition to limiting the number of CBS rules per entity, the number of filter items per CBS rule may also be limited.

Table 1 illustrates an exemplary data model. Of course, it should be noted that the data model shown in Table 1 is set forth for illustrative purposes only, and thus should not be construed as limiting in any manner.

TABLE 1

```
-- CBSRuleOrgPermission
EXEC upgdata.uUpgradeUtils.set_bitvector_bit('core', 'organization', 'permissions', 232,
FALSE);
-- CBS Rule, temporarily only for custom object sharing rules
ALTER TABLE core.custom_share_default ADD (is_cbs_rule CHAR(1) DEFAULT '0' NOT
NULL, boolean_filter VARCHAR2(765), calculated_formula VARCHAR2(4000));
-- CBS Rule Item
-- CBS Rule Item, temporarily only for custom object cbs rules, need key_prefix to make this an
associate entity
BEGIN
    upgdata.uUpgradeUtils.create_partitioned_table('core', 'custom_cbs_filter_item',
        upgdata.sfdc_column_array(
            upgdata.uUpgradeUtils.table_column('organization_id'         , 'CHAR(15)', FALSE),
            upgdata.uUpgradeUtils.table_column('key_prefix'              , 'CHAR(3)', FALSE),
            upgdata.uUpgradeUtils.table_column('custom_cbs_filter_item_id'    , 'CHAR(15)',
FALSE),
            upgdata.uUpgradeUtils.table_column('custom_share_default_id'     , 'CHAR(15)',
FALSE),
            upgdata.uUpgradeUtils.table_column('table_enum_or_id'            , 'VARCHAR2(120)',
FALSE),
            upgdata.uUpgradeUtils.table_column('column_enum_or_id'           , 'VARCHAR2(120)',
FALSE),
            upgdata.uUpgradeUtils.table_column('operation'                   , 'CHAR(1)', FALSE),
            upgdata.uUpgradeUtils.table_column('value'               , 'VARCHAR2(3000)',
FALSE),
```

TABLE 1-continued

```
        upgdata.uUpgradeUtils.table_column('sort_order')          , 'NUMBER', FALSE),
        upgdata.uUpgradeUtils.table_column('created_date')         , 'DATE', 'SYSDATE',
FALSE),
        upgdata.uUpgradeUtils.table_column('created_by')           , 'CHAR(15)', FALSE),
        upgdata.uUpgradeUtils.table_column('last_update')          , 'DATE', 'SYSDATE',
FALSE),
        upgdata.uUpgradeUtils.table_column('last_update_by')       , 'CHAR(15)', FALSE),
        upgdata.uUpgradeUtils.table_column('system_modstamp')      , 'DATE', 'SYSDATE',
FALSE),
        upgdata.uUpgradeUtils.table_column('row_version')          , 'NUMBER', '1', TRUE)
        ));
END;
/
EXEC upgdata.uUpgradeUtils.create_partitioned_index('pkcustom_cbs_filter_item', 'core',
'custom_cbs_filter_item', 'organization_id, custom_cbs_filter_item_id', 1);
EXEC upgdata.uUpgradeUtils.create_partitioned_index('akcustom_cbs_filter_item', 'core',
'custom_cbs_filter_item', 'organization_id, key_prefix, custom_share_default_id, sort_order', 3);
EXEC upgdata.uUpgradeUtils.create_partitioned_index('iecust_cbs_filter_item_sysmod', 'core',
'custom_cbs_filter_item', 'organization_id, key_prefix, system_modstamp', 2);
```

Additionally, in one embodiment, CBS rule creation, deletion and changes made by system administrators may be tracked for audit purposes. Further, when ownership is changed, CBS rules may be recalculated. Further still, deletion may be cascading to a corresponding share table. Also, CBS rules may be preserved during organization migration. In addition, lists, related lists, views, and APIs may be indirectly supported through sharing providers. Furthermore, CBS rules may be exposed on a metadata API. Further still, anew means for sharing objects may be provided. Also, a new organization perm may be added (e.g., CBSRuleOrgPermission, etc.).

Additionally, an administrative user with appropriate privileges may change the number of CBS rules allowed per entity. Further, corresponding entity objects and CBS rules may be locked as CBS rules are evaluated. Further still, changing CBS rule filter items may require a lock on the corresponding CBS rule. Also, CBS rules may not be changed when a sharing rule recalculation process is running. In another embodiment, exposing data on portals, websites, etc. may be performed using CBS.

Figure 4:
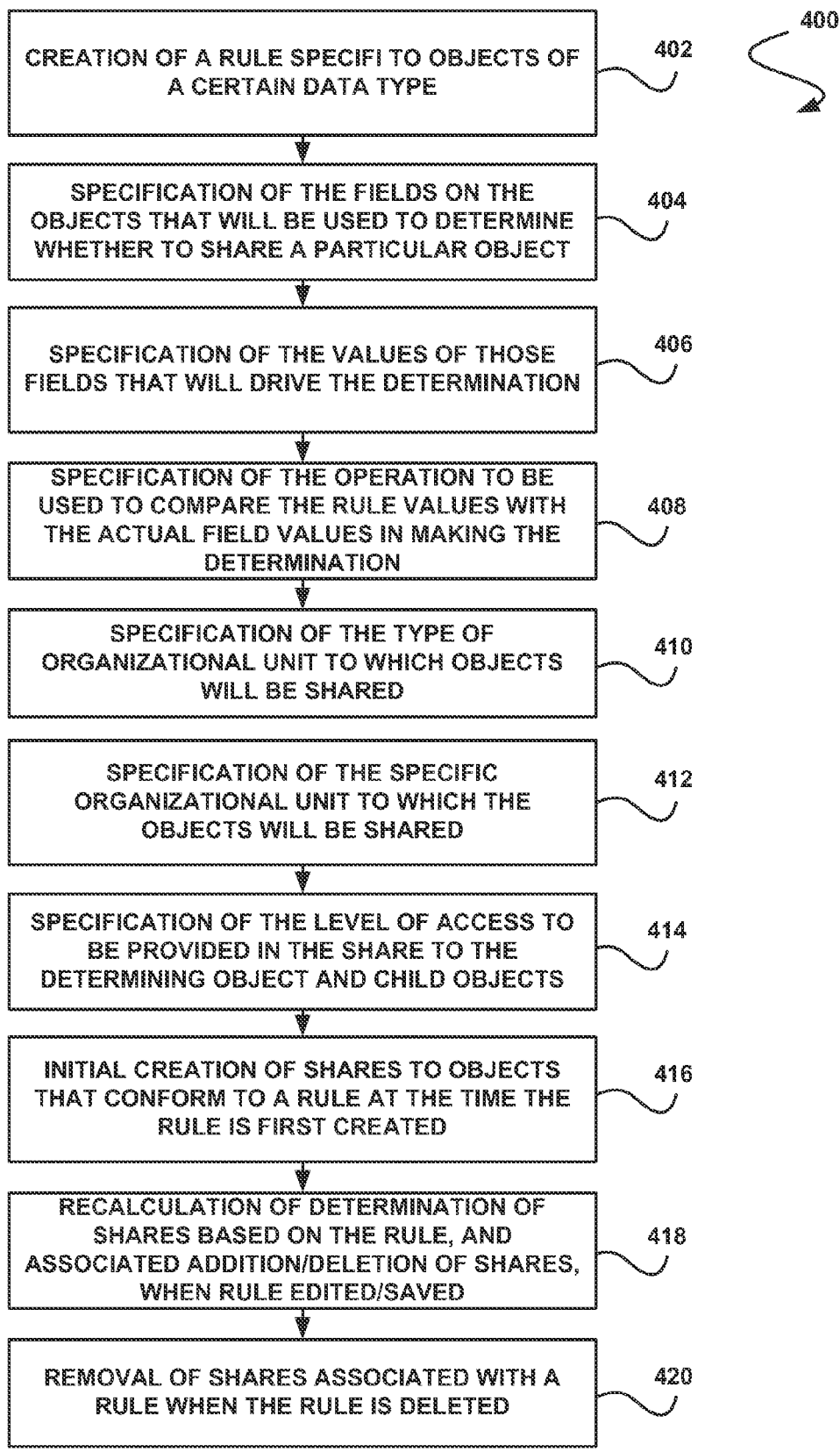
FIG. 4 illustrates a method for creating and maintaining rules, in accordance with another embodiment.

FIG. 4 illustrates a method 400 for creating and maintaining rules, in accordance with another embodiment. As an option, the present method 400 may be carried out in the context of the functionality of FIGS. 1-3. Of course, however, the method 400 may be carried out in any desired environment. The aforementioned definitions may apply during the present description.

As shown in operation 402, a rule specific to objects of a certain data type is created. Additionally, as shown in operation 404, the fields on the objects are specified, where the fields may be used to determine whether to share the particular object. Further, as shown in operation 406, the values of those fields are specified, where the values may drive the determination. Further still, as shown in operation 408, an operation is specified that will be used to compare the rule values with actual field values in making the determination. For example, the operation may include a requirement that a "status" value equal "active," that a "deal size" value be greater than or equal to 100,000, etc.

Also, as shown in operation 410, the type of the organizational unit to which objects will be shared is specified. For example, the type of the organizational unit may include "role," "group," "territory," etc. In addition, as shown in operation 412, the specific organizational unit to which the objects will be shared is specified. For example, the organizational unit may include a role of "VP of Products." Further, as shown in operation 414, the level of access to be provided in the share to the determining object as well as to child objects associated with the determining object is specified. For example, the level of access may include "read only," "read/write," etc.

Further still, as shown in operation 416, shares of objects that conform to a rule are initially created, for organizational entities and/or specific users named in or covered by the rule, at the time the rule is first created. Also, as shown in operation 418, when the rule is edited and saved again, the determination of the shares based on the rule are recalculated, and the associated addition or deletion of shares is performed. For example, the recalculation may be performed for one or more objects when a user or process changes the value of fields used to determine sharing under a rule. In another embodiment, shares to an object may be recalculated based on changes made to an object's data, which may result in the object either newly conforming to a rule, or no longer conforming to a rule. Additionally, as shown in operation 420, when a rule is deleted, the shares associated with the rule are removed.

System Overview

Figure 5:
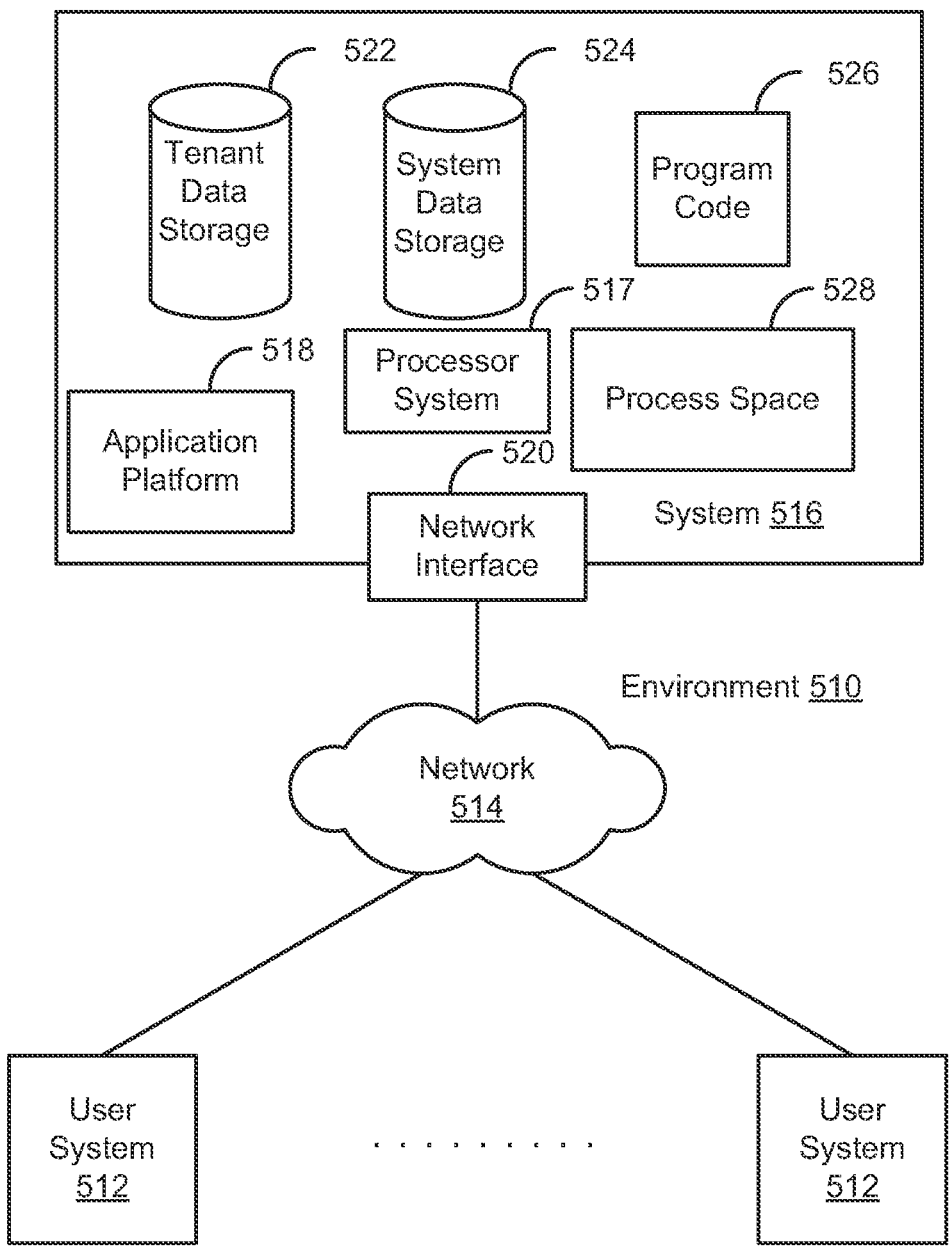
FIG. 5 illustrates a block diagram of an example of an environment wherein an on-demand database system might be used.

FIG. 5 illustrates a block diagram of an environment 510 wherein an on-demand database system might be used. Environment 510 may include user systems 512, network 514, system 516, processor system 517, application platform 518, network interface 520, tenant data storage 522, system data storage 524, program code 526, and process space 528. In other embodiments, environment 510 may not have all of the components listed and/or may have other elements instead of, or in addition to, those listed above.

Environment 510 is an environment in which an on-demand database system exists. User system 512 may be any machine or system that is used by a user to access a database user system. For example, any of user systems 512 can be a handheld computing device, a mobile phone, a laptop computer, a work station, and/or a network of computing devices. As illustrated in FIG. 5 (and in more detail in FIG. 6) user systems 512 might interact via a network 514 with an on-demand database system, which is system 516.

An on-demand database system, such as system 516, is a database system that is made available to outside users that do not need to necessarily be concerned with building and/or maintaining the database system, but instead may be available for their use when the users need the database system (e.g., on the demand of the users). Some on-demand database systems may store information from one or more tenants stored into tables of a common database image to form a multi-tenant database system (MTS). Accordingly, "on-demand database system 516" and "system 516" will be used interchangeably herein, A database image may include one or more database objects. A relational database management system (RDMS) or the equivalent may execute storage and retrieval of information against the database object(s). Application platform 518 may be a framework that allows the applications of system 516 to run, such as the hardware and/or software, e.g., the operating system. In an embodiment, on-demand database system 516 may include an application platform 518 that enables creation, managing and executing one or more applications developed by the provider of the on-demand database system, users accessing the on-demand database system via user systems 512, or third party application developers accessing the on-demand database system via user systems 512.

The users of user systems 512 may differ in their respective capacities, and the capacity of a particular user system 512 might be entirely determined by permissions (permission levels) for the current user. For example, where a salesperson is using a particular user system 512 to interact with system 516, that user system has the capacities allotted to that salesperson. However, while an administrator is using that user system to interact with system 516, that user system has the capacities allotted to that administrator. In systems with a hierarchical role model, users at one permission level may have access to applications, data, and database information accessible by a lower permission level user, hut may not have access to certain applications, database information, and data accessible by a user at a higher permission level. Thus, different users will have different capabilities with regard to accessing and modifying application and database information, depending on a user's security or permission level.

Network 514 is any network or combination of networks of devices that communicate with one another. For example, network 514 can be any one or any combination of a LAN (local area network), WAN (wide area network), telephone network, wireless network, point-t)-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 512 might communicate with system 516 using TCP/IP and, at a higher network level, use other common Internet protocols to communicate, such as HTTP, FTP, AFS, WAP, etc. In an example where HTTP is used, user system 512 might include an HTTP client commonly referred to as a "browser" for sending and receiving HTTP messages to and from an HTTP server at system 516. Such an HTTP server might be implemented as the sole network interface between system 516 and network 514, but other techniques might be used as well or instead. In some implementations, the interface between system 516 and network 514 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 516, shown in FIG. 5, implements a web-based customer relationship management (CRM) system. For example, in one embodiment, system 516 includes application servers configured to implement and execute CRM software applications as well as provide related data, code, forms, webpages and other information to and from user systems 512 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 516 implements applications other than, or in addition to, a CRM application. For example, system 516 may provide tenant access to multiple hosted (standard and custom) applications, including a CRM application. User (or third party developer) applications, which may or may not include CRM, may be supported by the application platform 518, which manages creation, storage of the applications into one or more database objects and executing of the applications in a virtual machine in the process space of the system 516.

One arrangement for elements of system 516 is shown in FIG. 5, including a network interface 520, application platform 518, tenant data storage 522 for tenant data 523, system data storage 524 for system data 525 accessible to system 516 and possibly multiple tenants, program code 526 for implementing various functions of system 516, and a process space 528 for executing MTS system processes and tenant-specific processes, such as running applications as part of an application hosting service. Additional processes that may execute on system 516 include database indexing processes.

Several elements in the system shown in FIG. 5 include conventional, well-known elements that are explained only briefly here. For example, each user system 512 could include a desktop personal computer, workstation, laptop, PDA, cell phone, or any wireless access protocol (WAP) enabled device or any other computing device capable of interfacing directly or indirectly to the Internet or other network connection. User system 512 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 512 to access, process and view information, pages and applications available to it from system 516 over network 514. Each user system 512 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 516 or other systems or servers. For example, the user interface device can be used to access data and applications hosted by system 516, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 512 and all of its components are operator configurable using applications, such as a browser, including computer code run using a central processing unit such as an Intel Pentium® processor or the like. Similarly, system 516 (and additional instances of an MTS, where more than one is present) and all of their components might be operator configurable using application(s) including computer code to run using a central processing unit such as processor system 517, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 516 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 516 is configured to provide webpages, forms, applications, data and media content to user (client) systems 512 to support the access by user systems 512 as tenants of system 516. As such, system 516 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 6:
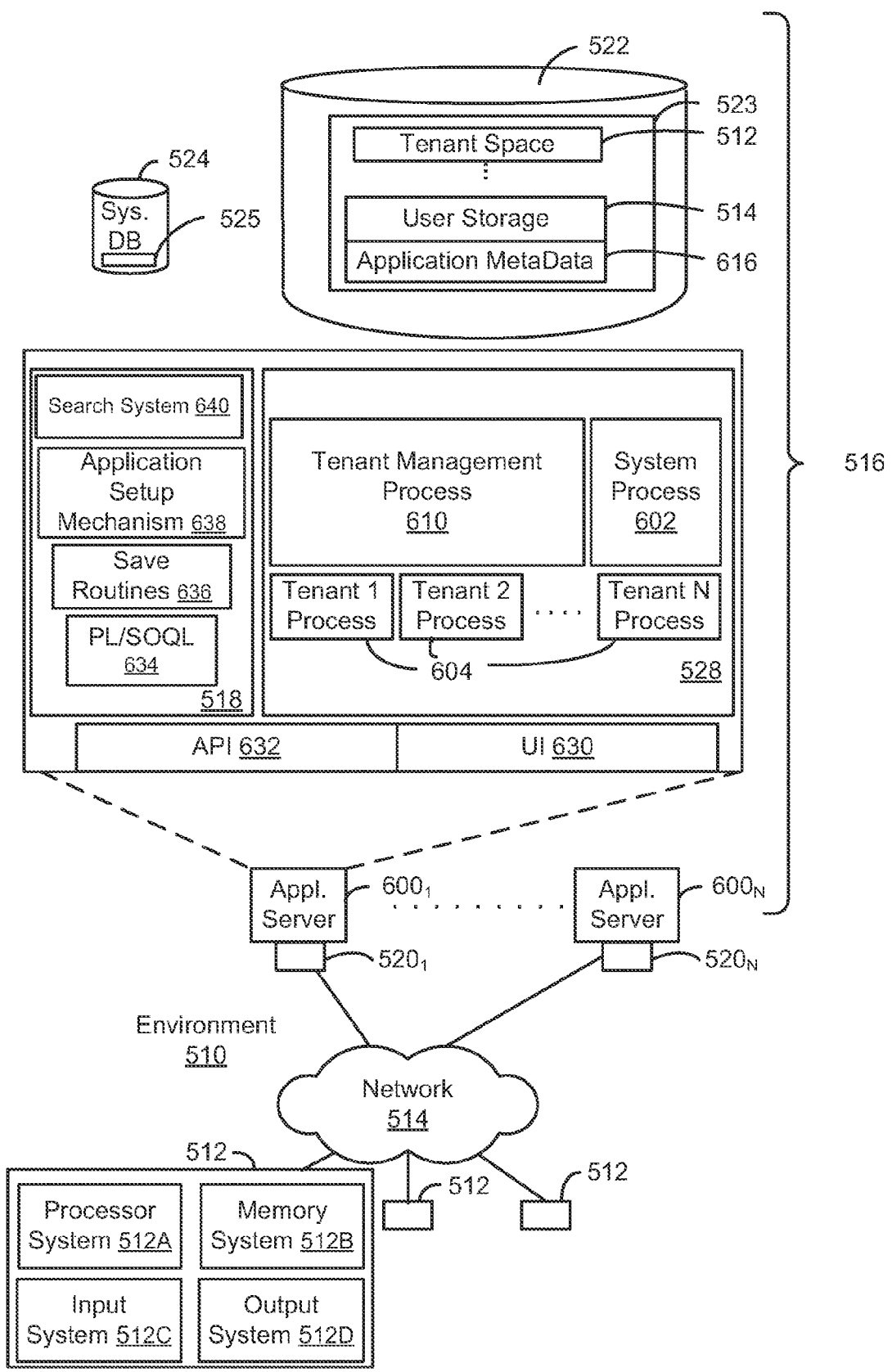
FIG. 6 illustrates a block diagram of an embodiment of elements of FIG. 5 and various possible interconnections between these elements.

FIG. 6 also illustrates environment 510. However, in FIG. 6 elements of system 516 and various interconnections in an embodiment are further illustrated. FIG. 6 shows that user system 512 may include processor system 512A, memory system 512B, input system 512C, and output system 512D FIG. 6 shows network 514 and system 516. FIG. 6 also shows that system 516 may include tenant data storage 522, tenant data 523, system data storage 524, system data 525, User Interface (UI) 630, Application Program Interface (API) 632, PL/SOQL 634, save routines 636, application setup mechanism 638, applications servers $600_1$-$600_N$, system process space 602, tenant process spaces 604, tenant management process space 610, tenant storage area 612, user storage 614, and application metadata 616. In other embodiments, environment 510 may not have the same elements as those listed above and/or may have other elements instead of, or in addition to, those listed above.

User system 512, network 514, system 516, tenant data storage 522, and system data storage 524 were discussed above in FIG. 5. Regarding user system 512, processor system 512A may be any combination of one or more processors. Memory system 512B may be any combination of one or more memory devices, short term, and/or long term memory. Input system 512C may be any combination of input devices, such as one or more keyboards, mice, trackballs, scanners, cameras, and/or interfaces to networks. Output system 512D may be any combination of output devices, such as one or more monitors, printers, and/or interfaces to networks. As shown by FIG. 6, system 516 may include a network interface 520 (of FIG. 5) implemented as a set of HTTP application servers 600, an application platform 518, tenant data storage 522, and system data storage 524. Also shown is system process space 602, including individual tenant process spaces 604 and a tenant management process space 610. Each application server 600 may be configured to tenant data storage 522 and the tenant data 523 therein, and system data storage 524 and the system data 525 therein to serve requests of user systems 512. The tenant data 523 might be divided into individual tenant storage areas 612, which can be either a physical arrangement and/or a logical arrangement of data. Within each tenant storage area 612, user storage 614 and application metadata 616 might be similarly allocated for each user. For example, a copy of a user's most recently used (MRU) items might be stored to user storage 614. Similarly, a copy of MRU items for an entire organization that is a tenant might be stored to tenant storage area 612. A 630 provides a user interface and an API 632 provides an application programmer interface to system 516 resident processes to users and/or developers at user systems 512. The tenant data and the system data may be stored in various databases, such as one or more Oracle™ databases.

Application platform 518 includes an application setup mechanism 638 that supports application developers' creation and management of applications, which may be saved as metadata into tenant data storage 522 by save routines 636 for execution by subscribers as one or more tenant process spaces 604 managed by tenant management process 610 for example. As an option, the application platform YY17 may further include a search systemYY40. Invocations to such applications may be coded using PL/SOQL 634 that provides a programming language style interface extension to API 632. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 616 for the subscriber making the invocation and executing the metadata as an application in a virtual machine.

Each application server 600 may be communicably coupled to database systems, e.g., having access to system data 525 and tenant data 523, via a different network connection. For example, one application server 600₁ might be coupled via the network 514 (e.g., the Internet), another application server 600$_{N-1}$ might be coupled via a direct network link, and another application server 600$_N$ might be coupled by yet a different network connection. Transfer Control Protocol and Internet Protocol (TCP/IP) are typical protocols for communicating between application servers 600 and the database system. However, it will be apparent to one skilled in the art that other transport protocols may be used to optimize the system depending on the network interconnect used.

In certain embodiments, each application server 600 is configured to handle requests for any user associated with any organization that is a tenant. Because it is desirable to be able to add and remove application servers from the server pool at any time for any reason, there is preferably no server affinity for a user and/or organization to a specific application server 600. In one embodiment, therefore, an interface system implementing a load balancing function (e.g., an F5 Big-IP load balancer) is communicably coupled between the application servers 600 and the user systems 512 to distribute requests to the application servers 600. In one embodiment, the load balancer uses a least connections algorithm to route user requests to the application servers 600. Other examples of load balancing algorithms, such as round robin and observed response time, also can be used. For example, in certain embodiments, three consecutive requests from the same user could hit three different application servers 600, and three requests from different users could hit the same application server 600. In this manner, system 516 is multi-tenant, wherein system 516 handles storage of, and access to, different objects, data and applications across disparate users and organizations.

As an example of storage, one tenant might be a company that employs a sales force where each salesperson uses system 516 to manage their sales process. Thus, a user might maintain contact data, leads data, customer follow-up data, performance data, goals and progress data, etc., all applicable to that user's personal sales process (e.g., in tenant data storage 522). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 516 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 516 might also maintain system level data usable by multiple tenants or other data. Such system level data might include industry reports, news, postings, and the like that are sharable among tenants.

In certain embodiments, user systems 512 (which may be client systems) communicate with application servers 600 to request and update system-level and tenant-level data from system 516 that may require sending one or more queries to tenant data storage 522 and/or system data storage 524. System 516 (e.g., an application server 600 in system 516) automatically generates one or more SQL statements (e.g., one or more SQL queries) that are designed to access the desired information. System data storage 524 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A computer program product, comprising a non-transitory computer usable medium having computer readable program code embodied therein, the computer readable program code adapted to be executed to implement a method for conditionally sharing an object with one or more entities, the method comprising:

specifying, by a system, a plurality of object types, each of the object types defining fields for objects of the object type;

storing a plurality of objects within the system, each of the objects being of one of the object types, each of the objects including the fields defined for the one of the object types, and each of the objects storing a value in each of the included fields;

receiving, by the system, a definition of a rule specific to one of the object types that is to be used to determine whether to share the objects of the object type that are stored within the system, the definition of the rule received by:

receiving a specification of one or more of the fields defined for the object type, receiving a requisite value for each of the specified one or more fields, receiving a specification of an operation to be used to compare each of the requisite values with values of the specified one or more fields that are in the objects of the object type that are stored within the system, receiving a specification of a type of organizational unit defined within the system, and receiving a specification of an organizational unit defined within the system that is of the specified type of organizational unit, the organizational unit being that with which the objects of the object type stored within the system will be shared, based on the determination of whether to share the objects of the object type stored within the system, receiving a specification of a type of access permitted when it is determined to share the objects of the object type stored within the system;

in response to receiving the rule, the system:

(a) applying, by the system, the rule to each of the objects within the system that are of the object type specific to the rule, including:

identifying from the rule the requisite values for each of the one or more fields defined for the object type that are specified by the rule, comparing, in accordance with corresponding operation specified by the rule, the requisite values identified from the rule to values of the one or more fields specified by the rule that are in the object, determining from the comparison whether each of the values of the one or more fields specified by the rule that are in the object meets the corresponding requisite value;

(b) based on the application of the rule to each of the objects within the system that are of the object type specific to the rule, conditionally sharing, by the system, the object with one or more entities of the system included in the organizational unit specified by the rule in accordance with the determining of whether each of the values of the one or more fields specified by the rule that are in the object meets the corresponding requisite value including:

when it is determined from the comparison that the values of all of the one or more fields specified by the rule that are in the object meet the requisite values specified by the rule, storing in a share table an association between the object and the one or more entities of the system included in the organizational unit specified by the rule and permitting the type of access to the object specified by the rule to the one or more entities of the system included in the organizational unit specified by the rule via the share table;

after performing (a)-(b) responsive to the receipt of the rule, identifying by the system when the rule is edited and saved, and in response repeating (a)-(b) for each of the objects within the system that are of the object type specific to the rule; and after performing (a)-(b) responsive to the receipt of the rule, identifying by the system when one of the values of the one or more fields specified by the rule that are in one of the objects of the object type specified by the rule is modified, and in response repeating (a)-(b) only for the object having the one of the values modified.

2. The computer program product of claim 1, wherein the object includes a system record.

3. The computer program product of claim 1, wherein the object includes a custom object.

4. The computer program product of claim 1, wherein the object is located within an organization of the system.

5. The computer program product of claim 1, wherein the fields of the object include one or more of an owner of the object, a name of the object, keywords associated with the object, and a monetary value associated with the object.

6. The computer program product of claim 1, wherein the rule is created by an administrator.

7. The computer program product of claim 1, wherein the one or more entities of the system include a group of users of the system.

8. The computer program product of claim 1, wherein the object is located within one organization of the system, and the one or more entities of the system include one or more users from another organization of the system.

9. The computer program product of claim 1, wherein sharing the object includes making the object visible to the one or more entities.

10. The computer program product of claim 1, wherein applying the rule to each of the objects within the system is performed before the one or more entities request the object.

11. The computer program product of claim 1, wherein the specified one or more fields of the object are at least in part independent of an owner of the object.

12. The computer program product of claim 1, wherein the operation is one of:

equal to and greater than.

13. The computer program product of claim 1, wherein the type of the organizational unit is one of: a role, a group, and a territory.

14. The computer program product of claim 1, wherein a predetermined number of rules are allowed for each of the entities of the system.

15. The computer program product of claim 1, wherein multiple rules are received and stored by the system for a particular one of the object types.

16. The computer program product of claim 1, wherein predetermined ones of the fields of the object are specified in a registry for being monitored for changes in order to identify when one of the values of the one or more fields specified by the rule that are in one of the objects of the object type specified by the rule is modified.

17. A method, comprising:
specifying, by a system, a plurality of object types, each of the object types defining fields for objects of the object type;
storing a plurality of objects within the system, each of the objects being of one of the object types, each of the objects including the fields defined for the one of the object types, and each of the objects storing a value in each of the included fields;
receiving, by the system, a definition of a rule specific to one of the object types that is to be used to determine whether to share the objects of the object type that are stored within the system, the definition of the rule received by:
  receiving a specification of one or more of the fields defined for the object type,
  receiving a requisite value for each of the specified one or more fields,
  receiving a specification of an operation to be used to compare each of the requisite values with values of the specified one or more fields that are in the objects of the object type that are stored within the system,
  receiving a specification of a type of organizational unit defined within the system, and
  receiving a specification of an organizational unit defined within the system that is of the specified type of organizational unit, the organizational unit being that with which the objects of the object type stored within the system will be shared, based on the determination of whether to share the objects of the object type stored within the system,
  receiving a specification of a type of access permitted when it is determined to share the objects of the object type stored within the system;
in response to receiving the rule, the system:
(a) applying, by the system, the rule to each of the objects within the system that are of the object type specific to the rule, including:
  identifying from the rule the requisite values for each of the one or more fields defined for the object type that are specified by the rule,
  comparing, in accordance with corresponding operation specified by the rule, the requisite values identified from the rule to values of the one or more fields specified by the rule that are in the object,
  determining from the comparison whether each of the values of the one or more fields specified by the rule that are in the object meets the corresponding requisite value;
(b) based on the application of the rule to each of the objects within the system that are of the object type specific to the rule, conditionally sharing, by the system, the object with one or more entities of the system included in the organizational unit specified by the rule in accordance with the determining of whether each of the values of the one or more fields specified by the rule that are in the object meets the corresponding requisite value including:
  when it is determined from the comparison that the values of all of the one or more fields specified by the rule that are in the object meet the requisite values specified by the rule, storing in a share table an association between the object and the one or more entities of the system included in the organizational unit specified by the rule and permitting the type of access to the object specified by the rule to the one or more entities of the system included in the organizational unit specified by the rule via the share table;
after performing (a)-(b) responsive to the receipt of the rule, identifying by the system when the rule is edited and saved, and in response repeating (a)-(b) for each of the objects within the system that are of the object type specific to the rule; and
after performing (a)-(b) responsive to the receipt of the rule, identifying by the system when one of the values of the one or more fields specified by the rule that are in one of the objects of the object type specified by the rule is modified, and in response repeating (a)-(b) only for the object having the one of the values modified.

18. An apparatus, comprising:
a processor for:
  specifying, by a system, a plurality of object types, each of the object types defining fields for objects of the object type;
  storing a plurality of objects within the system, each of the objects being of one of the object types, each of the objects including the fields defined for the one of the object types, and each of the objects storing a value in each of the included fields;
  receiving, by the system, a definition of a rule specific to one of the object types that is to be used to determine whether to share the objects of the object type that are stored within the system, the definition of the rule received by:
    receiving a specification of one or more of the fields defined for the object type,
    receiving a requisite value for each of the specified one or more fields,
    receiving a specification of an operation to be used to compare each of the requisite values with values of the specified one or more fields that are in the objects of the object type that are stored within the system,
    receiving a specification of a type of organizational unit defined within the system, and
    receiving a specification of an organizational unit defined within the system that is of the specified type of organizational unit, the organizational unit being that with which the objects of the object type stored within the system will be shared, based on the determination of whether to share the objects of the object type stored within the system,
    receiving a specification of a type of access permitted when it is determined to share the objects of the object type stored within the system;
  in response to receiving the rule, the system:
  (a) applying, by the system, the rule to each of the objects within the system that are of the object type specific to the rule, including:
    identifying from the rule the requisite values for each of the one or more fields defined for the object type that are specified by the rule,
    comparing, in accordance with corresponding operation specified by the rule, the requisite values identified from the rule to values of the one or more fields specified by the rule that are in the object,
    determining from the comparison whether each of the values of the one or more fields specified by the rule that are in the object meets the corresponding requisite value;
  (b) based on the application of the rule to each of the objects within the system that are of the object type specific to the rule, conditionally sharing, by the system, the object with one or more entities of the system included in the organizational unit specified by the rule in accordance with the determining of whether each of the values of the one or more fields specified by the rule that are in the object meets the corresponding requisite value including:

when it is determined from the comparison that the values of all of the one or more fields specified by the rule that are in the object meet the requisite values specified by the rule, storing in a share table an association between the object and the one or more entities of the system included in the organizational unit specified by the rule and permitting the type of access to the object specified by the rule to the one or more entities of the system included in the organizational unit specified by the rule via the share table;

after performing (a)-(b) responsive to the receipt of the rule, identifying by the system when the rule is edited and saved, and in response repeating (a)-(b) for each of the objects within the system that are of the object type specific to the rule; and after performing (a)-(b) responsive to the receipt of the rule, identifying by the system when one of the values of the one or more fields specified by the rule that are in one of the objects of the object type specified by the rule is modified, and in response repeating (a)-(b) only for the object having the one of the values modified.

19. A method for transmitting code for use in a multi-tenant database system on a transmission medium, the method comprising transmitting code for:

specifying, by a system, a plurality of object types, each of the object types defining fields for objects of the object type;

storing a plurality of objects within the system, each of the objects being of one of the object types, each of the objects including the fields defined for the one of the object types, and each of the objects storing a value in each of the included fields;

receiving, by the system, a definition of a rule specific to one of the object types that is to be used to determine whether to share the objects of the object type that are stored within the system, the definition of the rule received by:

receiving a specification of one or more of the fields defined for the object type, receiving a requisite value for each of the specified one or more fields, receiving a specification of an operation to be used to compare each of the requisite values with values of the specified one or more fields that are in the objects of the object type that are stored within the system, receiving a specification of a type of organizational unit defined within the system, and receiving a specification of an organizational unit defined within the system that is of the specified type of organizational unit, the organizational unit being that with which the objects of the object type stored within the system will be shared, based on the determination of whether to share the objects of the object type stored within the system, receiving a specification of a type of access permitted when it is determined to share the objects of the object type stored within the system;

in response to receiving the rule, the system:

(a) applying, by the system, the rule to each of the objects within the system that are of the object type specific to the rule, including:

identifying from the rule the requisite values for each of the one or more fields defined for the object type that are specified by the rule, comparing, in accordance with corresponding operation specified by the rule, the requisite values identified from the rule to values of the one or more fields specified by the rule that are in the object, determining from the comparison whether each of the values of the one or more fields specified by the rule that are in the object meets the corresponding requisite value;

(b) based on the application of the rule to each of the objects within the system that are of the object type specific to the rule, conditionally sharing, by the system, the object with one or more entities of the system included in the organizational unit specified by the rule in accordance with the determining of whether each of the values of the one or more fields specified by the rule that are in the object meets the corresponding requisite value including:

when it is determined from the comparison that the values of all of the one or more fields specified by the rule that are in the object meet the requisite values specified by the rule, storing in a share table an association between the object and the one or more entities of the system included in the organizational unit specified by the rule and permitting the type of access to the object specified by the rule to the one or more entities of the system included in the organizational unit specified by the rule via the share table;

after performing (a)-(b) responsive to the receipt of the rule, identifying by the system when the rule is edited and saved, and in response repeating (a)-(b) for each of the objects within the system that are of the object type specific to the rule; and after performing (a)-(b) responsive to the receipt of the rule, identifying by the system when one of the values of the one or more fields specified by the rule that are in one of the objects of the object type specified by the rule is modified, and in response repeating (a)-(b) only for the object having the one of the values modified.

\* \* \* \* \*